Nov. 1, 1938.  M. C. PUTNAM  2,134,765
CLAMP NAIL OR FASTENER
Filed June 8, 1936
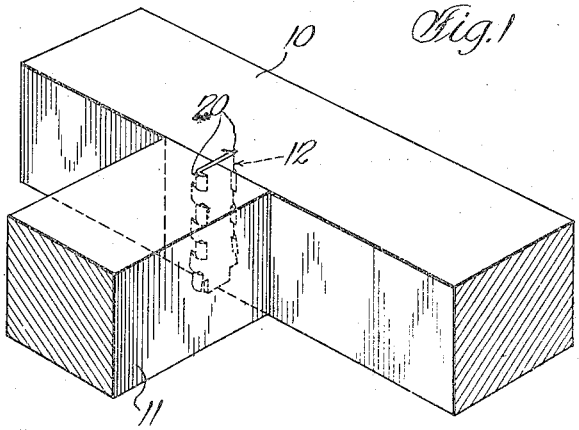
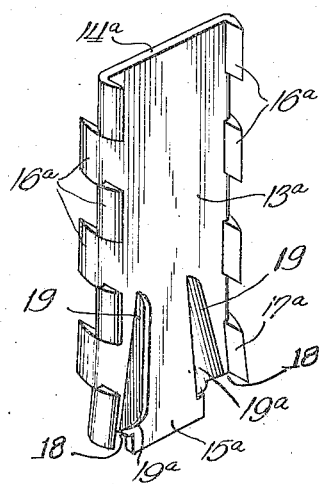
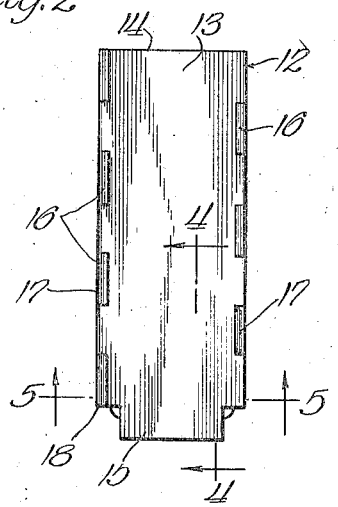
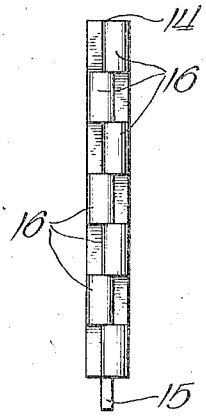
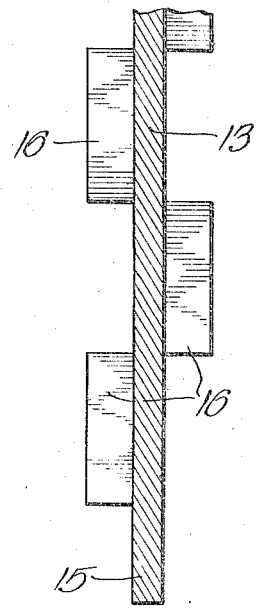
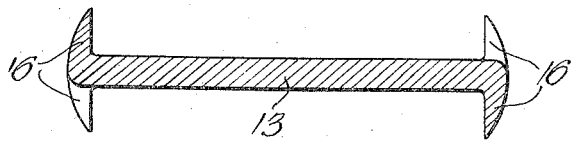
INVENTOR.
Mabel C. Putnam
By: Cox & Moore
ATTORNEY.

Patented Nov. 1, 1938

2,134,765

UNITED STATES PATENT OFFICE 2,134,765

CLAMP NAIL OR FASTENER

Mabel C. Putnam, Chicago, Ill., assignor to Clamp Nail Company, Chicago, Ill., a corporation of Illinois Application June 8, 1936, Serial No. 84,128

7 Claims. (Cl. 85—11)

The present invention relates to a fastener and has to do particularly with a fastener for rigidly fastening objects together at abutting faces that are generally angular to one another. The faces may be mitered or they may be disposed normally to one another.

The primary object of the invention is the provision of a fastener combining the benefits of a flat central web and discontinuous tabs providing opposed flanges, such flanges preferably at the end of such fastener being free from tabs to provide a tongue generally narrower than such web.

A secondary object of the invention is the provision of a new and improved type of fastener having parallel flanges formed of spaced tabs for causing the material of a joint construction to be forced into the spaces between the tabs when the fastener is driven into position in the kerf formed at the junction of the pieces to be joined.

Another object of the invention is to provide a unique fastener having tubular flanges to allow the material into which the fastener is driven to expand between succeeding teeth to retard retraction of the fastener.

Still another object of the invention is the provision of an improved fastener having a flat web, discontinuous parallel and flaring flanges, and a sharpened tongue free from flanges comprising a single piece of suitable material.

With the above and other desirable objects in view, the invention is hereinafter set forth with reference to the single sheet of drawing attached hereto and hereby made a part of this specification, and in which:

Figure 1 is a perspective view of a T joint held together by a fastener embodying the present invention and shown in dotted lines;

Figure 2 is a plan view of the fastener illustrated in Figure 1;

Figure 3 is a side elevation of the fastener illustrated in Figure 2;

Figure 4 is an enlarged section taken on the line 4—4 of Figure 2;

Figure 5 is a similarly enlarged section taken on the line 5—5 of Figure 2; and

Figure 6 is a perspective view of a modification of the fastener illustrated in the preceding views.

Like reference characters are used to designate similar parts in the drawing and in the description that follows:

In Figure 1 of the drawing, illustrating one embodiment of the present invention, there is shown as a part of a frame a side member 10 and an abutting transverse frame member 11. The end of frame member 11 abuts the member 10 at a right angle. Members 10 and 11 are joined by means of a clamp nail or fastener 12, the structure of which is illustrated in dotted lines.

The fastener 12 has substantially an I beam cross section as is best shown in Figure 5 and is formed of an integral piece of material, generally metal. It has a flat rectangular web 13. The fastener 12 has a driving end 14 which is at a right angle to the sides or margins of the web. At the other end of the fastener 12 is a centrally located tongue 15. The width of the tongue 15 generally is somewhat less than the width of the web 13.

Tabs or wings 16 extend along the side margins of the web from the driven end 14 to provide discontinuous flanges. In the illustration shown in Figures 1 and 2 the entire length of the web flanges 16 are parallel. However, in the form illustrated in Figure 6, where the flanges at the entering end of the web are tapered inwardly toward the driving end 14, I form the flanges 16 for the major length of the web parallel, but generally as the tabs 16 approach the tongue 15, one or more flanges at each side of the web flare outwardly as indicated at 17. The flaring tabs 17 terminate in points 18, which points are short of the driven edge of the tongue 15. The flanges 16 and 17 are tapered or otherwise treated at the outer edges thereof to provide sharp cutting edges as shown in Figure 5.

In connection with the form illustrated in Figure 6, web 13 may be swaged, as at 19a, at each side, the swaging extending from the beginning of the flared flanges 17 at an angle to the margins of the web 13 greater than the angle of flanges 17. Each swaging 19 increases from shallowness at its inner end to greatest depth as it approaches the entering end of the fastener adjacent to the front end flaring flanges 17a.

Before driving a fastener 12 into a joint, straight saw cut recesses or kerfs 20 are formed in the frame members 10 and 11. The saw cuts or kerfs 20 extend across the abutting faces of the members 10 to 11 in parallelism. The depth of each saw cut recess 20 preferably is slightly greater than one-half the maximum width of the fastener 12.

The driven end or tongue 15 of the clamp nail is forced into the parallel kerfs 20 from an outer face of the frame members 10 and 11. Thence, by applying force to the driving end 14 of the fastener 12, it is forced inwardly of the frame members 10 and 11 in a path determined by the saw cuts 20. The tongue 15 guides the fastener and maintains the fastener within such kerfs.

During the driving operation, if the device disclosed in Figure 6 is used, the flared flanges 17a bite into the material of the frame members 10 and 11 near the bottom of the kerfs 20 drawing the frame members toward one another, the parallel tabs 16a maintain the relative position of the frame members 10 and 11 after they have been drawn tightly together by the flaring tabs 17. When the type shown in Figure 2 is used, which are parallel flanges completely along the length of the web, the drawing together action is omitted.

When using either type of device, when the fastener is driven fully within the members 10 and 11, a retraction of the fastener 12 is retarded by the discontinuous tabs or wings 16 and 16a.

The staggeredly arranged tabs 16 and 17 may be formed in any desirable manner. In the form of joint fastener shown in Figures 1, 2, 3, 4, and 5, the tabs 16 that are transversely opposed are oppositely directed, and those tabs that are longitudinally adjacent are oppositely directed at the margin of the web. Each tab 16 is tapered to provide or has at its outer margin a cutting edge. The tabs 16 and 17 at either margin of the web are uniform and are uniformly spaced, leaving gaps between each wing 16 whereby a herringbone appearance is obtained as is clearly illustrated in Figure 3. When a fastener is driven within the members 10 and 11, the material of such members, being fibrous and resilient, expands into the spaces between adjacent tabs 16 and 17 on either side of web 13 at either of its margins and retards retraction of the fastener 12.

The fastener shown in Figure 6 is a modification. The transversely opposing flanges or wings 16a and 17a on each side of the web 13a project in the same direction. The driven end of the fastener is designated 15a and the driving end 14a. The forward tabs 17a instead of being on opposite faces of web 13a are on the same face of such web, whereas in the previously described form the tabs 17 at opposite margins were on opposite faces of web 13.

While the clamp nail 12 and the kerfs 20 are shown and previously described as being of the full depth of the members 10 and 11, such construction may be modified so that the kerfs and clamp nail both terminate short of one face of the frame members, thus providing for a smooth and unbroken face unmarred by the appearance of a kerf or edge of the clamp nail.

The driving end of the fastener may be straight, convexly curved, concavely curved, or triangular. The thickness of the driving end of each fastener is the same as that of the web thereof.

The edges of the driven and driving ends of the dowels shown are parallel. It is manifest that the different shaped ends may be interchanged as required.

In connection with the construction shown in Figure 6, it is to be understood that the depressions 19 are formed by a swaging operation which causes the metal at the flange portions to flare outwardly whereby to produce the flared entering end for the fastener. These flared recesses assist in the wedging action since the inwardly inclined sides tend to cause the material of the two pieces to be joined together to move inwardly as the fastener moves into the kerf.

What I claim as new and desire to secure by Letters Patent of the United States is:

1. A fastener of the class described comprising a web with sides that are substantially parallel the greater portion of their lengths, a tongue integral with, projecting from, and of less width than the driven end of said web, and rows of tapered tabs at each side of said web, alternate tabs projecting from said web in opposite directions to provide two discontinuous flanges on each face of said web.

2. A fastener comprising a flat web, a tongue of similar cross section but of less width than said web, the web having parallel sides over a portion of its length and flaring outwardly adjacent said tongue, and tapered tabs at the margins of said web, alternate tabs being oppositely directed and being of uniform size and shape.

3. A fastener as described in claim 2, and in which shallow depressions of increasing depth extend from points within said web outwardly to the intersection of the web and tongue and terminate at a locking shoulder behind the tongue.

4. A fastener as described in claim 2, and in which shallow depressions of increasing depth extend from points within said web outwardly to the intersection of the web and tongue, the depressions being generally linear and oblique to the tapered edges on the tabs thereto.

5. A fastener of the class described comprising a web with sides that are substantially parallel the greater portion of their lengths, a tongue integral with and projecting from and of less width than the driven end of said web, and rows of tapered tabs at each side of said web in parallelism with said parallel sides, all the tabs projecting from said web alternately in opposite directions to provide discontinuous flanges, said sides and tabs flaring outwardly from normal parallelism adjacent one end.

6. A fastener of the class described, comprising a web having sides substantially parallel throughout the greater portion of their lengths, a driving tongue integral with and extending from one end of said web, said tongue being of less width than the driven end of said web, and parallel rows of tapered tabs at each side of said web, alternate tabs on opposite sides projecting from said web in the same direction and alternate tabs on each side projecting in opposite directions to provide two discontinuous flanges on each face of said web.

7. A fastener of the class described, comprising a web having sides substantially parallel throughout the greater portion of their lengths, a driving tongue integral with and extending from one end of said web, said tongue being of less width than the driven end of said web, and parallel rows of tapered tabs at each side of said web, alternate tabs on opposite sides of said web being projected in opposite directions and alternate tabs on each side also being projected in opposite directions to provide two discontinuous flanges on each face of said web.

MABEL C. PUTNAM.